United States Patent Office 3,112,285
Patented Nov. 26, 1963

3,112,285
OXIDATION RESISTANT BUTYL RUBBER CONTAINING A WAX AND A POLYMERIC DIALKYL FUMARATE ESTER
Richard R. Phelan, Nixon, David R. Hammel, Colonia, William H. Meyer, Cranford, and Walter L. Dunkel, Fanwood, N.J., assignors to Esso Research and Engineering Company, a corporation of Delaware
No Drawing. Filed Nov. 3, 1958, Ser. No. 771,203
5 Claims. (Cl. 260—28.5)

The present invention relates to a rubbery vulcanizate and more particularly to a method for improving the ozone resistance of butyl rubber.

It is well known that ozone has a deleterious effect upon natural and synthetic rubbers. The ozone which is present in the air breaks down to form free radicals which subsequently attack the double bonds in the rubbery chain and cause cracking and deterioration therein. In the past, various waxes have been added to improve ozone resistance. However, wax alone has not provided a completely satisfactory ozone resistant vulcanizate.

It has now been found that the ozone resistance is substantially increased if both a wax and a paraflow polymer are added to the rubbery polymer. Furthermore, there is an unobvious and unexpected synergistic effect, for the combination is far superior to the effect of the two additives taken individually.

Thus, in accordance with one embodiment of this invention, the butyl rubber copolymer is fabricated and compounded with a wax and paraflow polymer in addition to any of the normal compounding ingredients. The compounded rubber is subsequently cured to a vulcanizate with improved ozone resistance.

The rubbery compounds to which this invention may be applicable are any unsaturated rubbers such as butyl rubber, natural rubber, neoprene, SBR (the copolymer of major amounts of butadiene and styrene), and NBR (the copolymer of butadiene and acrylonitrile). However, butyl rubber is preferred. It has excellent ozone resistance initially because of the low unsaturation which it possesses (iodine number less than 50, generally about 1 to 10). However, through the utilization of this invention, it is possible to increase the ozone resistance of butyl rubber to an even greater extent.

The butyl rubber polymer is prepared by reacting 70 to 99.5 parts by weight, preferably 85 to 99.5, of an isoolefin with 30 to 0.5 parts by weight, preferably 15 to 0.5, of multiolefin. The isoolefin, in general, is a $C_4$ to $C_7$ compound, e.g., isobutylene or 2-methyl-1-butene. The multiolefin, in general, is a $C_4$ to $C_{10}$ conjugated diolefin, e.g., isoprene, butadiene, or piperylene. The preferred polymer is obtained by reacting 95 to 99.5% by weight of isobutylene with 0.5 to 5% by weight of isoprene.

Mixture of monomers, preferably with 1 to 5 volumes of inert diluent, e.g., methyl chloride, should be cooled to a temperature between 0 and —200° C. and it is preferred that the temperature range be between —60° and —130° C. The cold mixture is polymerized by the addition of a Friedel-Crafts catalyst, preferably an aluminum halide catalyst in a liquid or dissolved form, in conjunction with vigorous agitation. The amount of catalyst is generally about 0.15 to 1.0% by weight of the mixed olefins.

The polymerization reaction is rapid and the polymer precipitates out of the solution in the form of a slurry or flocculent white solid. The polymer, which is recovered and dried, has a Staudinger molecular weight between 20,000 and 150,000, preferably 45,000 to 60,000; and an iodine number between 0.5 and 50, preferably between 1 and 15. The preparation of this copolymer is described in U.S. Patent 2,356,128 which is incorporated herein by reference.

The butyl rubber, similarly to other rubbers, can be compounded with various other materials. Some examples of the types of materials that can be incorporated are as follows: stabilizers, plasticizers, fillers, accelerators, softeners, catalysts, and crosslinking agents. Compounding may be accomplished by subjecting the rubber to a severe mixing treatment in a Banbury or on a mill at a temperature range of 75° F. to 500° F. This drastic treatment homogenizes the polymer and removes foci of impurities. Some compounding ingredients may be added during the working in this mill. The treated polymer can then be worked on an open-roll mill with the addition of other compounding ingredients. The butyl rubber within the scope of this invention includes those which are halogenated, e.g., chlorinated and brominated; the preferred range of halogen in the rubber structure is from 0.9 to 1.5 weight percent for chlorinated butyl rubber and 1.5 to 3.0 weight percent for brominated butyl rubber.

In accordance with this invention, 3 to 10 parts by weight of wax, preferably 3 to 6 parts, are added to 100 parts of rubbery copolymer during the compounding procedure. A wax in this invention is defined as an unctuous, fusible, variable viscous to solid substance having a characteristic waxy luster which is insoluble in water but soluble in most organic solvents. These waxes can be grouped according to their origin as animal, e.g., beeswax, stearic acid, Chinese insect wax; mineral, e.g., ozocerite, montan, ceresin, and paraffin; and vegetable, e.g., carnauba, Japan, bayberry, and candelilla. However, the preferred waxes of this invention are those which are obtained by artificial or synthetic means to include petroleum waxes, e.g., paraffin wax and microcrystalline wax, and chemically synthesized waxes, e.g., amides of saturated fatty acids. The paraffin wax of this invention is a white, translucent, waxy, tasteless, odorless solid consisting of a mixture of solid hydrocarbons, chiefly of the methane series obtained from petroleum. These paraffin waxes can be prepared by fractionating crude petroleum and removing a paraffin cut boiling from 170° to 310° F. with subsequent chilling and filter pressing to provide a solid wax. The specific gravity of these waxes is 0.88 to 0.915 and the melting point is from 42° to 60° C.

The microcrystalline wax of this invention is derived from petroleum and characterized by fineness of crystals as compared to the larger crystals of paraffin wax. These waxes are white, amber, or black solids usually odorless, tasteless, and chemically inert; and they comprise saturated aliphatic hydrocarbons. The microcrystalline waxes have a specific gravity of 0.92 to 0.94 and melting point of 190° to 195° F. and molecular weight between 400 and 700.

The chemically synthesized compounds of this invention can include phthalamides, halogenated straight-chain hydrocarbons, unsaponifiable waxes, emulsifiable wax-like solids, diglycol stearate, synthetic hydrocarbon waxes, symmetrical and unsymmetrical ketones, synthetic branched-chain hydrocarbons, polymerized ether waxes. However, the preferred synthetic wax is an amide or imide condensation derivative of a saturated fatty acid having 12 to 18 or more carbon atoms. These amides can be prepared by reacting a high fatty acid with ammonia and have the structure

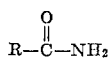

wherein R is an alkyl group. The especially preferred wax is ethylene bis stearamide. A detailed description of all the afore-mentioned waxes is provided on pages 216 to 297 of The Chemistry and Technology of Waxes, by Albin H. Warth, Reinhold Publishing Corporation, New York, 1947, which is incorporated herein by reference.

Paraflow polymer, as defined in this invention, comprises a polymerized dialkyl fumarate acid ester of a saturated aliphatic alcohol of 8 to 18, preferably 12 to 14, carbon atoms, and an oil base stock. The esters, which are polymerized or copolymerized, have the general formula

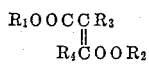

wherein $R_1$ and $R_2$ and $C_8$ to $C_{18}$ alkyl groups, usually, but not necessarily, alike and $R_3$ and $R_4$ may be either hydrogen or methyl. The preferred ester, lorol fumarate, is prepared either by direct esterification of lorol alcohol with fumaric acid, or by ester interchange, i.e., by reacting lorol alcohol with a lower alkyl fumarate such as a methyl fumarate or diethyl fumarate. The lorol alcohol is a commercial (technical grade) alcohol. It is a mixture of $C_8$ to $C_{18}$ normal alcohols and has an average molecular weight of 205. It is commercially available as lorol-"7" alcohol. The lorol fumarate is then polymerized, preferably by the use of a peroxide catalyst, such as benzoyl peroxide or acetyl peroxide, etc. The molecular weight of the polymer can be between 1000 and 40,000, and the viscosity can be about 100 to 2000 seconds at 210° F. Homologues of fumaric acid, e.g., chlorofumaric acid, mesaconic acid, and chloromesaconic acid, are also applicable to this invention. Generally, the amount of polymer added to the oil stock base will be within the range of 0.01 to 10% by weight. The oil stock base is selected according to the purpose for which the blend is to be used. For instance, mineral lubricating oils may be utilized and have a viscosity range of about 40 to 200 seconds Saybolt at 210° F. However, it is preferred to employ waxy mineral lubricating oils of the paraffinic type which normally have a viscosity index in the range of 90 to 115. However, naphthenic lubricating oils may also be used, especially when enough of the fumarate polymer is added to raise the viscosity index. The oil base stock may also be a lighter mineral oil fraction such as one of the gas oil or the kerosene boiling range. This paraflow polymer is described in detail in U.S. Patents 2,509,203 and 2,618,602 which are also incorporated herein by reference. The paraflow polymer is incorporated in the rubbery copolymer during the compounding step, in addition to the wax, generally in the range of 0.5 to 5 parts by weight per 100 parts of copolymer, preferably 1 to 4 parts.

After the rubbery copolymer has been compounded with the desired ingredients, including wax and paraflow polymer, it is cured by any known method, e.g., steam, pressure, or mold curing. A particularly satisfactory method is to cure the compounded butyl rubber in mold at a temperature between 100 to 200° C. for a time interval ranging from 5 minutes to 5 hours.

Thus, in accordance with this invention an end product is obtained which has improved resistance to ozone. Therefore, the butyl rubber can be used more effectively in electrical insulation, rubber tubing, and the like, where high ozone resistance is a paramount characteristic.

The following examples are submitted to illustrate and not to limit this invention.

*Example I*

A rubbery copolymer was provided comprising approximately 98% isobutylene and 2% isoprene. Rubbers A, B, and C were prepared by mixing various compounds in proportions by weight as indicated below:

| Compounds | A | B | C |
|---|---|---|---|
| Copolymer | 100 | 100 | 100 |
| SRF Black [a] | 75 | 75 | 75 |
| FEF Black [b] | 45 | 45 | 45 |
| Zinc Oxide | 5 | 5 | 5 |
| Paraflow Polymer [c] | 1 | | 1 |
| Ethylene Bis Stearamide | | 6 | 6 |
| Tellurac [d] | 1.3 | 1.3 | 1.3 |
| Altax [e] | 1.2 | 1.2 | 1.2 |
| Spider Sulfur [f] | 2.0 | 2.0 | 2.0 |

[a] Semi-reinforcing furnace black.
[b] Fast extruding furnace black.
[c] 50% lorol fumarate and 50% inert diluent by volume.
[d] Tellurium diethyl dithiocarbamate.
[e] Mercapto benzothiazyl disulfide.
[f] Fine particle size sulfur dispersed in about 2.5% of magnesium carbonate.

The above compounding was accomplished by mill mixing at a temperature of about 120° F. The compounded materials were subsequently cured in a mold at a temperature of 320° F. for 20 minutes. The cured rubber products were then exposed to 0.2% ozone and the time until breakage was determined as follows:

Rubber— Minutes to break
A _____ 18
B _____ 51
C _____ 86

The above example demonstrates the unobvious synergistic effect which the combination of wax and paraflow polymer has upon the ozone resistance of butyl rubber. One would expect the inclusion of both items would be equal to the sum of either alone (18+51=69). However, there is a substantial increase to 86 which is indicative of the surprising results of this invention.

*Example II*

A rubbery copolymer was provided comprising approximately 98% isobutylene and 2% isoprene. Rubbers D, E, and F were prepared by mixing various compounds in proportions by weight as indicated below:

| Compounds | D | E | F |
|---|---|---|---|
| Copolymer | 100 | 100 | 100 |
| FEF Black | 30 | 30 | 30 |
| SRF Black | 80 | 80 | 80 |
| Petrolatum | 10 | 10 | 10 |
| Zinc Oxide | 5 | 5 | 5 |
| Tuads | 1.5 | 1.5 | 1.5 |
| Captax [a] | 2.0 | 2.0 | 2.0 |
| Spider Sulfur | 1.25 | 1.25 | 1.25 |
| Sulfasan-R [b] | 1.25 | 1.25 | 1.25 |
| Paraflow Polymer [c] | | 3.0 | 3.0 |
| Paraffin Wax | | 6.0 | |
| Paraffin and Microcrystalline Wax | | | 6.0 |

[a] Mercaptobenzothiazole.
[b] Morpholine disulfide, a nonblooming sulfur donor.
[c] 50% lorol fumarate; 50% inert diluene by volume.

The compounding, curing, and exposure to ozone were similar to the procedure described in Example I. The time until breakage was determined as follows:

Rubber— Minutes
D _____ 87
E _____ 107
F _____ 98

This example shows that the resistance to ozone of butyl rubber is increased by adding thereto a paraffin and/or a microcrystalline wax in combination with paraflow polymer.

Having described the general nature and embodiments of this invention, the true scope is now particularly pointed out in the appended claims.

What is claimed is:

1. A composition of matter with increased ozone resistance comprising: 100 parts by weight of a copolymer of 70 to 99.5 wt. percent of a $C_4$ to $C_7$ isoolefin and 30 to 0.5 wt. percent of a $C_4$ to $C_{10}$ multiolefin; 3 to 10 parts of a wax selected from the group consisting of paraffin wax, microcrystalline wax, an amide condensation derivative of a saturated fatty acid having at least 12 carbon atoms and an imide condensation derivative of a saturated fatty acid having at least 12 carbon atoms; and 0.25 to 2.5 parts of a polymeric dialkyl fumarate acid ester of a saturated aliphatic alcohol of 8 to 18 carbon atoms.

2. A composition of matter of increased ozone resistance comprising: 100 parts by weight of a copolymer of 70 to 99.5 wt. percent of a $C_4$ to $C_7$ isoolefin and 30 to 0.5 wt. percent of a $C_4$ to $C_{10}$ multiolefin; 3 to 10 parts of ethylene bis stearamide; and 0.25 to 2.5 parts of a polymeric dialkyl fumarate acid ester of a saturated aliphatic alcohol of 8 to 18 carbon atoms.

3. A composition of matter of increased ozone resistance comprising: 100 parts by weight of a copolymer of 70 to 99.5 wt. percent of a $C_4$ to $C_7$ isoolefin and 30 to 0.5 wt. percent of a $C_4$ to $C_{10}$ multiolefin; 3 to 10 parts of paraffin wax; and 0.25 to 2.5 parts of a polymeric dialkyl fumarate acid ester of a saturated aliphatic alcohol of 8 to 18 carbon atoms.

4. A composition of matter of increased ozone resistance comprising: 100 parts by weight of a copolymer of 70 to 99.5 wt. percent of a $C_4$ to $C_7$ isoolefin and 30 to 0.5 wt. percent of a $C_4$ to $C_{10}$ multiolefin; 3 to 10 parts of microcrystalline wax; and 0.25 to 2.5 parts of a polymeric dialkyl fumarate acid ester of a saturated aliphatic alcohol of 8 to 18 carbon atoms.

5. A composition of matter which comprises 100 parts of the copolymer of 98% isobutylene with 2% isoprene, 0.5 parts of a polymeric dialkyl fumarate acid ester of a saturated aliphatic alcohol of 8 to 18 carbon atoms, 6 parts ethylene bis stearamide, 120 parts of carbon black, 1.3 parts of tellurium diethyl dithiocarbamate, 1.2 parts of mercapto benzothiazyl disulfide; said composition being capable of being cured at a temperature of 320° F. for 20 minutes to provide a vulcanizate therefrom with high ozone resistance therein of 86 minutes to break upon exposure to 0.2% ozone.

References Cited in the file of this patent

UNITED STATES PATENTS

| | | |
|---|---|---|
| 2,509,203 | Bartlett | May 30, 1950 |
| 2,567,016 | Gessler et al. | Sept. 4, 1951 |
| 2,618,602 | Bartlett | Nov. 18, 1952 |
| 2,658,052 | Signer et al. | Nov. 3, 1953 |
| 2,678,892 | Harvey | May 18, 1954 |
| 2,690,780 | Cousins | Oct. 5, 1954 |
| 2,884,392 | Clark | Apr. 28, 1959 |
| 2,889,313 | Patrick | June 2, 1959 |
| 2,913,482 | Dazzi | Nov. 17, 1959 |
| 2,974,113 | Dunkel et al. | Mar. 7, 1961 |
| 2,993,023 | Pfau et al. | July 18, 1961 |

OTHER REFERENCES

Neal: Rubber Age, pages 569–572, August 1950.

Warth: "The Chemistry and Technology of Waxes," Reinhold Publishing Corp. New York, N.Y., 1956, page 56.